(12) United States Patent
Xue et al.

(10) Patent No.: US 11,279,278 B2
(45) Date of Patent: Mar. 22, 2022

(54) PEDESTRIAN WARNING DEVICE HAVING GRILLE COVER

(71) Applicant: Suzhou Sonavox Electronics Co., LTD., Suzhou (CN)

(72) Inventors: Xiafeng Xue, Suzhou (CN); Jianming Zhou, Suzhou (CN); Guoqiang Chai, Suzhou (CN); Shenggang Tao, Suzhou (CN); Kaihua Qian, Suzhou (CN)

(73) Assignee: Suzhou Sonavox Electronics Co., Ltd., Suzhou (CN)

( * ) Notice: Subject to any disclaimer, the term of this patent is extended or adjusted under 35 U.S.C. 154(b) by 0 days.

(21) Appl. No.: 17/266,143

(22) PCT Filed: Aug. 7, 2019

(86) PCT No.: PCT/CN2019/099643
§ 371 (c)(1),
(2) Date: Feb. 5, 2021

(87) PCT Pub. No.: WO2020/030009
PCT Pub. Date: Feb. 13, 2020

(65) Prior Publication Data
US 2021/0309146 A1    Oct. 7, 2021

(30) Foreign Application Priority Data

Aug. 8, 2018 (CN) .......................... 201821276598.7

(51) Int. Cl.
*B60Q 5/00* (2006.01)
*B60R 19/52* (2006.01)

(52) U.S. Cl.
CPC .............. *B60Q 5/005* (2013.01); *B60R 19/52* (2013.01)

(58) Field of Classification Search
CPC ........ B60Q 5/005; B60Q 5/006; B60R 19/52; G01G 1/005; G01G 1/095; G01G 1/0955
See application file for complete search history.

(56) References Cited

U.S. PATENT DOCUMENTS 2,182,987 A * 12/1939 Hopkins .............. B60Q 1/1423
   250/237 R
2,380,691 A *  7/1945 Gross ...................... F21V 11/00
   362/510

(Continued)

FOREIGN PATENT DOCUMENTS

| CN | 203485824 U  | 3/2014 |
| JP | 2017013656 A | 1/2017 |
| KR | 20090085222 A | 8/2009 |

OTHER PUBLICATIONS

English Translation of International Search Report for PCT/CN2019/099643 (dated Feb. 13, 2020) (2 pages).

(Continued)

*Primary Examiner* — Hoi C Lau
(74) *Attorney, Agent, or Firm* — Peter L. Brewer; Thrive IP

(57) ABSTRACT

A pedestrian warning device, comprising a warning device body having a cavity and an open end portion, and a sound-generating device mounted inside the cavity, wherein the pedestrian warning device further comprises a grille cover arranged on the end portion of the warning device body; the grille cover comprises at least two grille layers spaced at intervals from the inside to the outside, each of the grille layers comprising a plurality of crossbeams, the crossbeams being arranged at intervals so as to form gaps to enable gas to flow between adjacent crossbeams, and wherein a width of the gaps is not greater than a width of the crossbeams, and the crossbeams of adjacent grille layers are interleaved with each other. The grille cover can protect (Continued)

internal component of the pedestrian warning device and will not affect the performance of the pedestrian warning device.

10 Claims, 3 Drawing Sheets

(56) References Cited

U.S. PATENT DOCUMENTS

| | | | | |
|---|---|---|---|---|
| 2,540,389 | A * | 2/1951 | Fowler | G08G 1/095 362/290 |
| 3,863,251 | A * | 1/1975 | Gould | G08G 1/005 340/815.53 |
| 4,019,170 | A * | 4/1977 | Gould | G08G 1/005 340/944 |
| 4,101,191 | A * | 7/1978 | Gould | G08G 1/005 248/219.3 |
| 4,142,173 | A * | 2/1979 | Gould | F21V 21/116 174/650 |
| 4,158,222 | A * | 6/1979 | Cook | F21V 5/02 359/742 |
| 4,240,063 | A * | 12/1980 | Gould | G08G 1/005 340/944 |
| 4,385,284 | A * | 5/1983 | Gould | G09F 13/04 362/359 |
| 4,435,696 | A * | 3/1984 | Gould | G09F 13/04 340/944 |
| 5,299,111 | A * | 3/1994 | Parduhn | F21V 11/02 362/290 |
| 5,654,705 | A * | 8/1997 | Houten | G08G 1/095 116/63 R |
| 5,715,881 | A * | 2/1998 | Ruskamp | G08G 1/095 150/154 |
| 6,107,941 | A * | 8/2000 | Jones | G08G 1/0955 116/63 R |
| 6,323,781 | B1 * | 11/2001 | Hutchison | G08G 1/095 340/815.4 |
| 6,426,704 | B1 * | 7/2002 | Hutchison | F21S 8/00 340/693.5 |
| 6,441,750 | B1 * | 8/2002 | Hutchison | G08G 1/0955 340/815.4 |
| 6,527,422 | B1 * | 3/2003 | Hutchison | F21V 29/505 362/290 |
| 7,307,546 | B1 * | 12/2007 | Partap | G08G 1/095 340/815.45 |
| 8,466,962 | B2 * | 6/2013 | Hutchison | G08G 1/095 348/148 |
| 9,590,555 | B2 * | 3/2017 | Gauthier | E01F 9/696 |
| 10,216,066 | B2 * | 2/2019 | Pilby | G03B 15/06 |
| 2001/0054970 | A1 * | 12/2001 | Jones | G08G 1/0955 340/915 |
| 2002/0089419 | A1 * | 7/2002 | Martineau | F21V 5/04 340/463 |
| 2005/0030203 | A1 * | 2/2005 | Sharp | H05B 45/12 340/907 |
| 2005/0099319 | A1 * | 5/2005 | Hutchison | H05B 45/12 340/908 |
| 2007/0013552 | A1 * | 1/2007 | Povey | G08G 1/095 340/907 |
| 2007/0052553 | A1 * | 3/2007 | Hutchison | G08G 1/095 340/907 |
| 2008/0158354 | A1 * | 7/2008 | Hutchison | G08G 1/095 348/143 |
| 2010/0141419 | A1 * | 6/2010 | Coward | B60Q 1/22 340/464 |
| 2010/0182164 | A1 * | 7/2010 | Diba | G09F 9/33 340/907 |
| 2010/0189295 | A1 * | 7/2010 | Datz | H04R 1/30 381/340 |
| 2017/0155989 | A1 * | 6/2017 | Jeon | H04R 1/023 |
| 2019/0035263 | A1 * | 1/2019 | Loes | G08G 1/095 |
| 2019/0035264 | A1 * | 1/2019 | Salter | G08G 1/166 |
| 2019/0200110 | A1 * | 6/2019 | Kajihara | H04R 9/025 |

OTHER PUBLICATIONS

Written Opinion for PCT/CN2019/099643 (dated Feb. 13, 2020) (dated Feb. 13, 2020) (3 pages).

* cited by examiner

PEDESTRIAN WARNING DEVICE HAVING GRILLE COVER

CROSS REFERENCE TO RELATED APPLICATIONS

This application claims the benefit of CN 201821276598.7 filed Aug. 8, 2018. That application is titled "Pedestrian Warning Device Having Grille Cover."

This application also claims the benefit of PCT/CN2019/099643 filed Aug. 7, 2019. That application is also titled "Pedestrian Warning Device Having Grille Cover Device."

Each of these applications in incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Technical Field of the Invention

The present disclosure relates to a pedestrian warning device having a grille cover.

Background of the Invention

With the development of science and technology and people's awareness of environmental protection, new energy vehicles will surely become a new development trend in the automotive industry. For new energy vehicles, such as electric vehicles, since they do not use internal combustion engines, they are quite quiet when running at low speeds. When a vehicle is driving behind a pedestrian, the pedestrian often fails to notice the presence of the vehicle, which increases the probability of a vehicle accident. Therefore, a vehicle exterior pedestrian warning device is an indispensable part of the new energy vehicles, and because the vehicle exterior pedestrian warning device is directly exposed outside the vehicle, it is easily disturbed by external environmental factors.

SUMMARY OF THE INVENTION

Aimed at the above mentioned problems, the present disclosure provides a pedestrian warning device having a grille cover, which can protect internal components and parts of the pedestrian warning device, and will not affect the performance of the pedestrian warning device.

To achieve the above purpose, a technical solution employed by the present disclosure is as blow.

A pedestrian warning device comprising a warning device body having a cavity and an open end portion, and a sound generating device mounted inside the cavity, a grille cover covering the end portion of the warning device body, wherein:

the grille cover comprises at least two grille layers spaced at intervals from inside to outside, with each of the grille layers comprising a plurality of crossbeams, the crossbeams are arranged at intervals so as to form gaps to enable gas to flow between adjacent crossbeams, a width of the gaps is not greater than a width of the crossbeams, and the crossbeams of adjacent grille layers are interleaved with each other.

In one embodiment, the gaps in an inner grille layer are completely sheltered by the crossbeams of an outer grille layer.

In one embodiment, the grille cover comprises an inside grille layer and an outside grille layer, and an extension direction of the crossbeams of the inside grille layer and an extension direction of the crossbeams of the outside grille layer are consistent.

Preferably, outer surfaces of the respective crossbeams of the inside grille layer have reinforcing ribs extending outwards.

More preferably, outer ends of the reinforcing ribs are located inside the outside grille layer.

More preferably, the reinforcing ribs directly face the gaps of the outside grille layer.

In one embodiment, the grille cover further comprises a housing arranged around the grille layers, the grille layers are fixedly connected in the housing, and the housing is connected to the one end portion of the warning device body.

In one embodiment, two end portions of each of the crossbeams are fixedly connected to the housing, respectively.

Preferably, an overall shape of the grille layers is circular or rectangular.

In one embodiment, the sound generating device comprises a loudspeaker, and the grille cover is arranged outside the loudspeaker.

In one embodiment, the grille cover comprises an inside grille layer and an outside grille layer spaced up and down, the inside grille layer is located below the outside grille layer, and the two layers have a height difference;

the inside grille layer is composed of a plurality of mutually parallel crossbeams; the outside grille layer is composed of a plurality of mutually parallel crossbeams; the crossbeams of the inside grille layer and the crossbeams of the outside grille layer are interleaved with each other so that each gap of the inside grille layer directly faces one crossbeam of the outside grille layer, respectively, and each gap of the outside grille layer directly faces one crossbeam of the inside grille layer, respectively;

an extension direction of the crossbeams of the inside grille layer and an extension direction of the crossbeams of the outside grille layer are consistent, outer surfaces of the respective crossbeams of the inside grille layer have reinforcing ribs extending outwards, outer ends of the reinforcing ribs are located inside the outside grille layer, and the reinforcing ribs are located in the middle position of the crossbeams and directly face the gaps of the outside grille layer.

Compared with the prior art, the technical solutions employed by the present disclosure have the following advantages:

The interleaving arranged crossbeams of the grille cover completely shelters the inner components and parts of the pedestrian warning device, which not only protects the speaker frame, the connecting ring and other components of the pedestrian warning device, but also can be air permeable and has little effect on the diffusion of the sound field due to the crossbeams are in an interleaving arrangement.

BRIEF DESCRIPTION OF THE DRAWINGS

For more clearly explaining the technical solutions of the present disclosure, the accompanying drawings used to describe embodiments are simply introduced in the following. Apparently, the below described drawings merely show a part of the embodiments of the present disclosure, and those skilled in the art can obtain other drawings according to the accompanying drawings without creative work.

Wherein, 1—warning device body; 10—cavity; 2—loudspeaker; 21—speaker frame; 22—connecting ring; 3—grille cover; 30—housing; 31—inside grille layer; 31a—crossbeam; 31b—gap; 31c—reinforcing rib; 32—outside grille layer; 32a—crossbeam; 32b—gap.

DETAILED DESCRIPTION OF EXEMPLARY EMBODIMENTS

In the following, the preferable embodiments of the present disclosure are explained in detail combining with the accompanying drawings so that the advantages and features of the present disclosure can be easily understood by the skilled persons in the art. It should be noted that the explanation on these implementations is to help understanding of the present disclosure, and is not intended to limit the present disclosure. Further, the technical features involved in the various embodiments of the present disclosure described below may be combined with each other as long as they do not conflict with each other.

Figure 1:
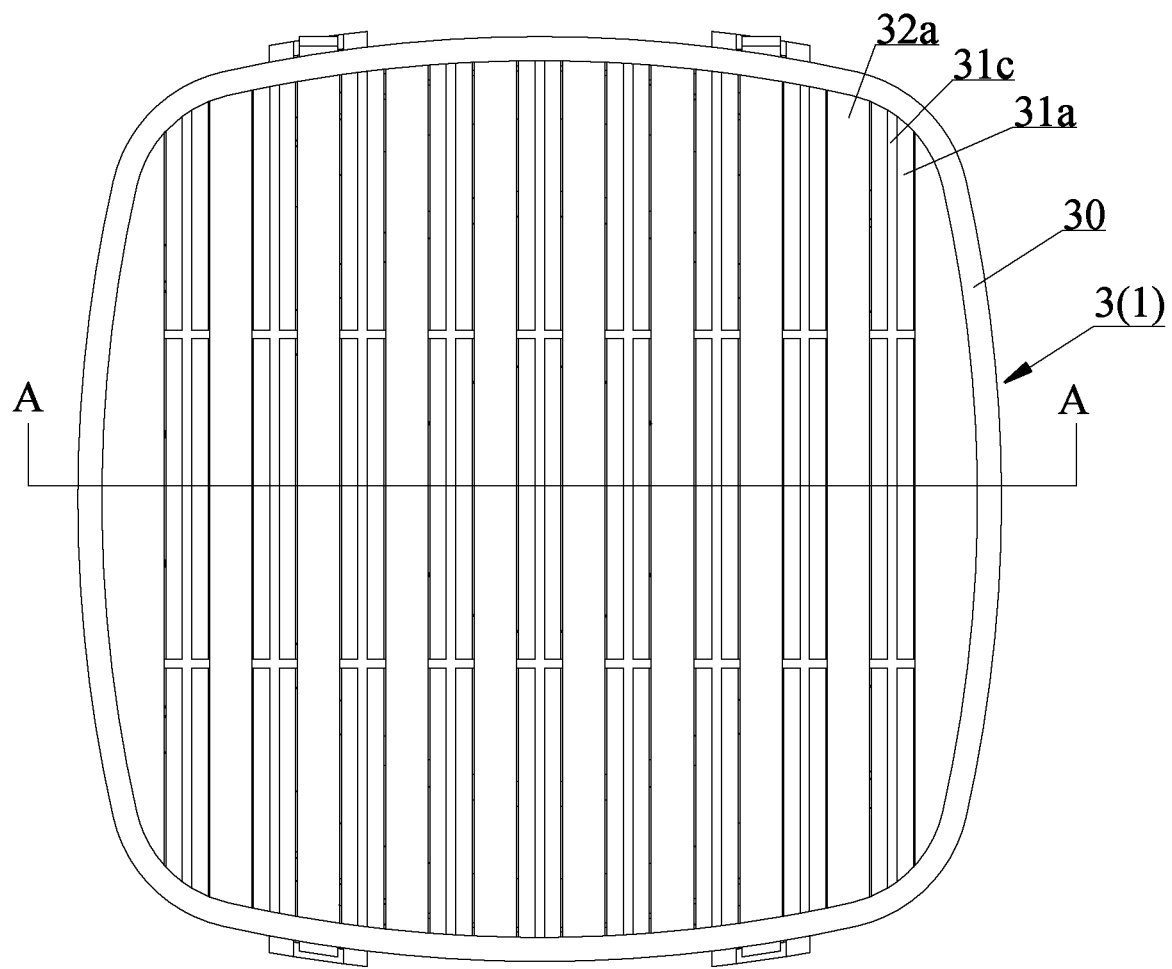
FIG. 1 is a top view of a pedestrian warning device having a grille cover according to the present disclosure.
Figure 2:
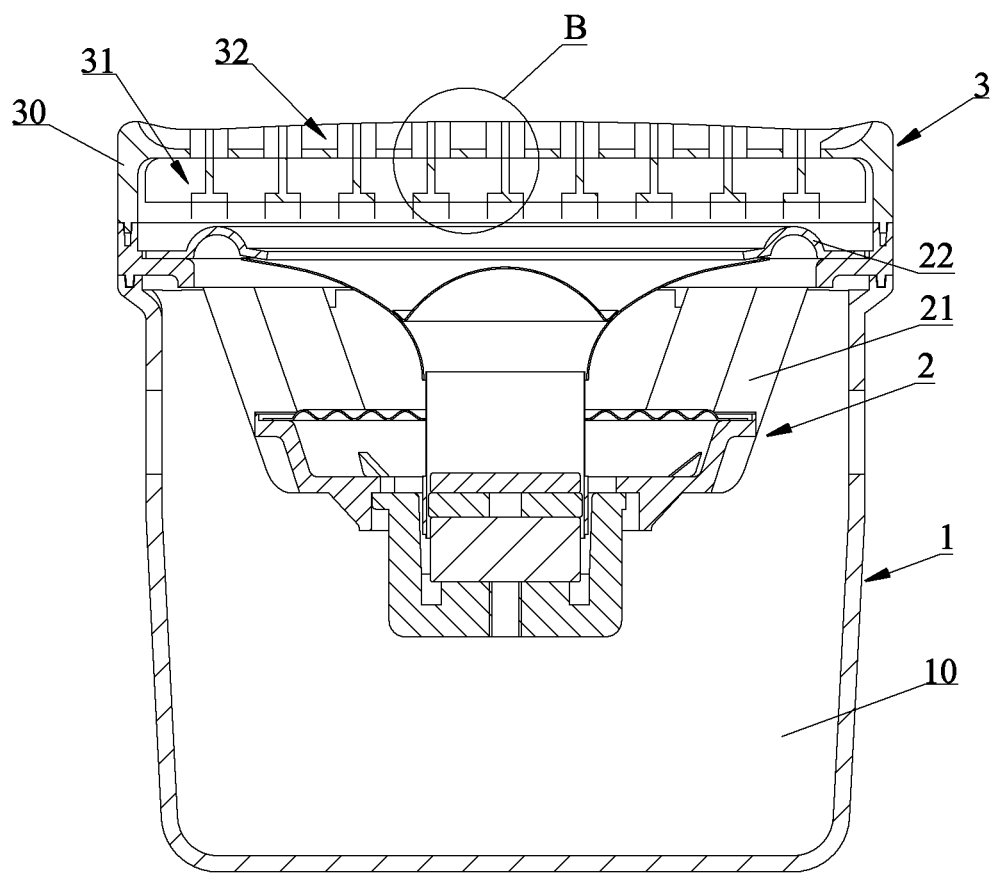
FIG. 2 is a cross-sectional view along the Line A-A in FIG. 1.
Figure 3:
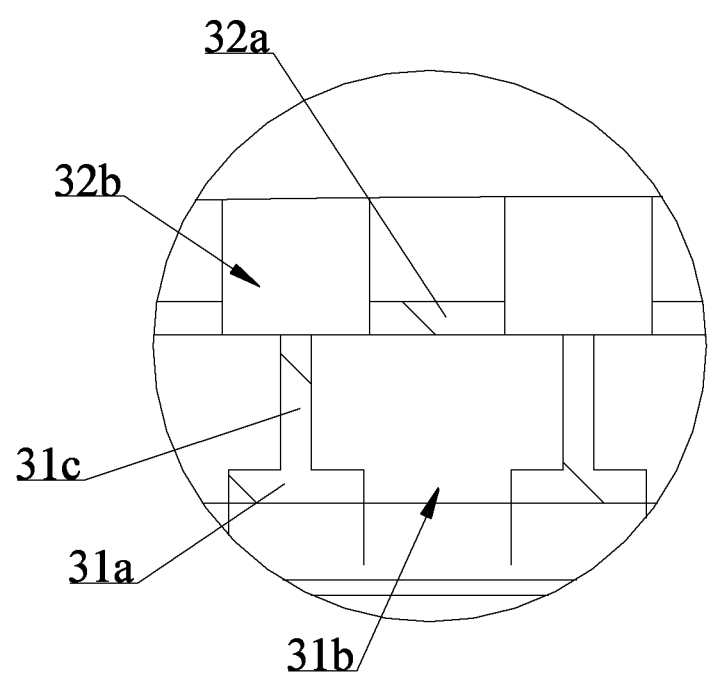
FIG. 3 is a partial enlarged view of B in FIG. 2.

FIGS. 1-3 shows a pedestrian warning device having a grille cover according to the present disclosure, which is installed outside a new energy vehicle to give out a pedestrian warning sound to warn pedestrians. Referring to FIGS. 1-3, the pedestrian warning device comprises a warning device body 1, the warning device body 1 has a cavity 10 and an open end portion, and components and parts, such as a sound generating device for generating pedestrian warning sounds, are mounted in the cavity 10. Specifically in this embodiment, an upper end portion of the warning device body 1 is open so as to communicate the cavity 10 with the outside air, and the sound generating device is specifically a loudspeaker 2, and as is well-known, the loudspeaker 2 has a speaker frame 21, the speaker frame 21 is provided with a vibration system composed of a paper cone, etc. and a magnetic circuit system composed of T-yoke or U-yoke, etc., and the paper cone is connected to an upper end of the speaker frame 21 via a connecting ring 22.

The pedestrian warning device further comprises a grille cover 3 externally arranged on the upper end portion of the warning device body 1, and the grille cover 3 is externally arranged outside the loudspeaker 2, and comprises at least two grille layers spaced at intervals from the inside to the outside. The orientation words "outer", "outside", "inner" and "inside" mentioned in the present disclosure are defined with reference to the cavity 10 in the body of the loudspeaker 2, and the side farther from the cavity 10 is outside, and the opposite is inside. In the embodiment specifically corresponding to FIGS. 1-3, the grille cover 3 comprises an inside grille layer 31 and an outside grille layer 32 spaced up and down, the inside grille layer 31 is located below the outside grille layer 32, and the two layers have a height difference.

Each of the grille layers comprises a plurality of crossbeams, the crossbeams are arranged at intervals so as to form gaps to enable gas to flow between adjacent crossbeams, and a width of the gaps is not greater than a width of the crossbeams, and the crossbeams of adjacent grille layers are in an interleaving arrangement. In the embodiment specifically corresponding to FIGS. 1-3, the inside grille layer 31 is composed of a plurality of mutually parallel crossbeams 31a, the crossbeams 31a are arranged at intervals, and gaps 31b are formed between the crossbeams 31a; the outside grille layer 32 is composed of a plurality of mutually parallel crossbeams 32a, the crossbeams 32a are arranged at intervals, and gaps 32b are formed between the crossbeams 32a; the crossbeams 31a and the crossbeams 32a are interleave interleaved with each other so that each gap 31b of the inside grille layer 31 directly faces one crossbeam 32a of the outside grille layer 32, respectively, and each gap 32b of the outside grille layer 32 directly faces one crossbeam 31a of the inside grille layer 31, respectively, that is to say, the gaps in the inside grille layer 31 are completely sheltered by the crossbeams of the outside grille layer 32, and the gaps in the outside grille layer 32 are completely sheltered by the crossbeams of the inside grille layer 31, which avoids foreign objects such as dust from entering the cavity 10 of the warning device body 1, and the gaps between the crossbeams does not affect air circulation.

It should also be noted that an extension direction of the crossbeams 31a of the inside grille layer 31 and an extension direction of the crossbeams 32a of the outside grille layer 32 are consistent. Outer surfaces of the respective crossbeams 31a of the inside grille layer 31 have reinforcing ribs 31c extending outwards, outer ends (namely upper ends) of the reinforcing ribs 31c are located inside (namely below) the outside grille layer 32, and the reinforcing ribs 31c are located in the middle position of the crossbeams 31a and directly face the gaps 32b of the outside grille layer 32.

The grille cover 3 further comprises a housing 30 arranged around the grille layers, two end portions of each of the crossbeams are fixedly connected to the housing 30, respectively, such that the grille layers are fixedly connected in the housing 30, and the housing 30 is fixedly connected to the upper end portion of the warning device body 1 and is in tight fit with the body of the loudspeaker 2. An overall shape of the grille layers is circular or rectangular, and the grille layers completely shelter the paper cone of the loudspeaker 2, that is to say, the grille layers are arranged just above the paper cone, and the area of the grille layers must cover (greater than or equal to) the radiation area of the paper cone. The inner surface of the housing 30 has an arc transition section, which is beneficial to the diffusion of the sound field of the loudspeaker 2.

The interleaving arranged crossbeams of the grille cover 3 completely shelters the inner components and parts of the pedestrian warning device, which not only protects the cone, the suspension ring and other components of the pedestrian warning device, but also can be air permeable and has little effect on the diffusion of the sound field due to the crossbeams are in an interleaving arrangement; the grille cover 3 has a transition arc, which is also beneficial to the diffusion of the sound field; the grille cover 3 has a high-strength reinforcing rib distribution, which can well protect the pedestrian warning grille cover 3.

The embodiments described above are only for illustrating the technical concepts and features of the present disclosure, and are intended to make those skilled in the art being able to understand the present disclosure and thereby implement it, and should not be concluded to limit the protective scope of this disclosure.

What is claimed is:

1. A pedestrian warning device configured to be installed on a vehicle operating under the power of a battery, comprising:
    a warning device body having a cavity and an open end portion;
    a sound generating device mounted inside the cavity, the sound generating device generating a warning sound to pedestrians;
    a grille cover arranged on the open end portion of the warning device body, wherein:
        the grille cover comprises at least two grille layers spaced at intervals from inside to outside, with each of the grille layers comprising a plurality of crossbeams;
        the crossbeams are arranged at intervals so as to form gaps to enable gas to flow between adjacent crossbeams,
        a width of the gaps is not greater than a width of the crossbeams;
        the crossbeams of adjacent grille layers are interleave with each other;
        the grille cover comprises an inside grille layer and an outside grille layer spaced up and down, with the inside grille layer being located below the outside grille layer, and the two layers have a difference in height;
        the inside grille layer is composed of a plurality of mutually parallel crossbeams, and the outside grille layer is also composed of a plurality of mutually parallel crossbeams,
        the crossbeams of the inside grille layer and the crossbeams of the outside grille layer are interleaved with each other so that each gap of the inside grille layer directly faces one crossbeam of the outside grille layer, respectively, and each gap of the outside grille layer directly faces one crossbeam of the inside grille layer, respectively; and
        an extension direction of the crossbeams of the inside grille layer and an extension direction of the crossbeams of the outside grille layer are consistent.

2. The pedestrian warning device of claim 1, wherein the gaps in the inner grille layer are completely sheltered by the crossbeams of the outer grille layer.

3. The pedestrian warning device of claim 2, wherein outer surfaces of the respective crossbeams of the inside grille layer have reinforcing ribs extending outwards.

4. The pedestrian warning device of claim 3, wherein outer ends of the reinforcing ribs are located inside the outside grille layer.

5. The pedestrian warning device of claim 3, wherein the reinforcing ribs directly face the respective gaps of the outside grille layer.

6. The pedestrian warning device of claim 1, wherein:
    the grille cover further comprises a housing arranged around the grille layers,
    the grille layers are fixedly connected in the housing, and
    the housing is connected to the open end portion of the warning device body.

7. The pedestrian warning device of claim 6, wherein two end portions of each of the crossbeams are fixedly connected to the housing, respectively.

8. The pedestrian warning device of claim 6, wherein an overall shape of the grille layers is circular or rectangular.

9. The pedestrian warning device of claim 1, wherein:
    the sound generating device comprises a loudspeaker, and
    the grille cover is arranged outside the loudspeaker.

10. The pedestrian warning device of claim 1, wherein:
    outer surfaces of the respective crossbeams of the inside grille layer have reinforcing ribs extending outwards;
    outer ends of the reinforcing ribs are located inside the outside grille layer; and
        the reinforcing ribs are located in the middle position of the crossbeams and directly face the gaps of the outside grille layer.

* * * * *